Jan. 12, 1943.  G. E. ROEDDING  2,308,108
DIRECTION SIGNAL SWITCH
Filed Sept. 26, 1941   3 Sheets-Sheet 1
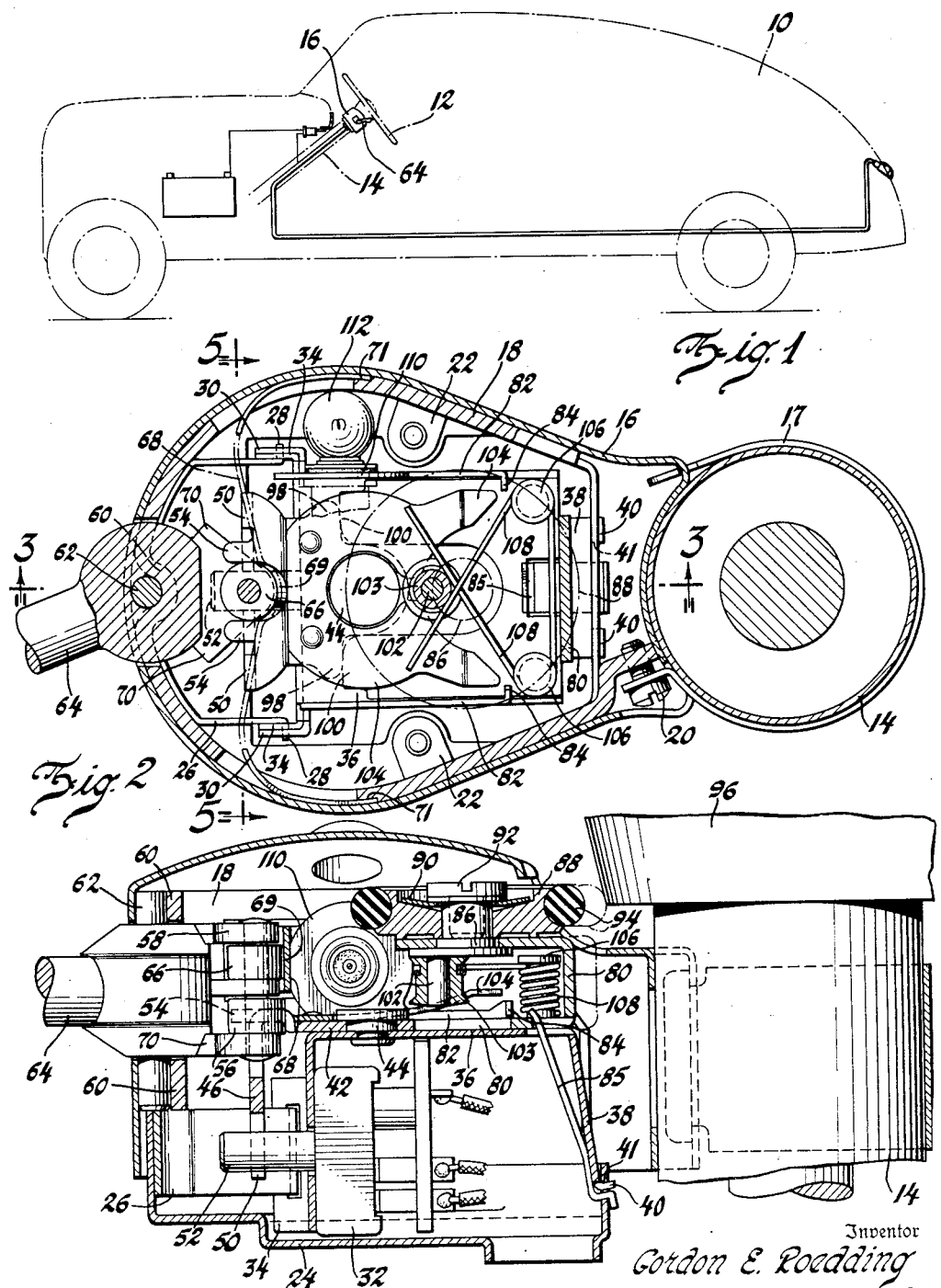
Inventor
Gordon E. Roedding
By Blackmore, Spencer & Flint
Attorneys Inventor
Gordon E. Roedding Jan. 12, 1943.　　　G. E. ROEDDING　　　2,308,108
DIRECTION SIGNAL SWITCH
Filed Sept. 26, 1941　　　3 Sheets-Sheet 3

Inventor
Gordon E. Roedding
By Blackmore, Spencer & Flint
Attorneys

Patented Jan. 12, 1943

2,308,108

UNITED STATES PATENT OFFICE 2,308,108

DIRECTION SIGNAL SWITCH

Gordon E. Roedding, Anderson, Ind., assignor to General Motors Corporation, Detroit, Mich., a corporation of Delaware Application September 26, 1941, Serial No. 412,365

12 Claims. (Cl. 200—59)

My invention relates to direction signal switches for motor vehicles.

It is an object of my invention to provide a direction signal switch which is simple of design and which can be made economically. Further, I provide a switch for motor vehicles which requires a minimum of attention on the part of the operator.

More specifically, it is an object of my invention to provide a direction signal switch simple in design and which may be fitted as an accessory to vehicles already on the road. A further specific object is a direction signal switch which is automatically reset to the switch-off position after the turn has been completed.

Figure 1 of the drawings is a phantom view of a passenger vehicle equipped with my direction signal device.

Figure 2 is a plan view of my direction signal switch with parts broken away and in section to show details.

Figure 3 is a view substantially on line 3—3 of Figure 2.

Figure 5:
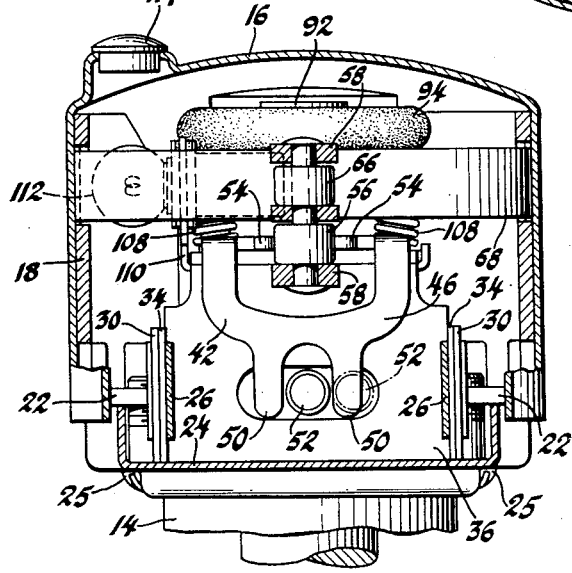
Figure 5 is a view in section substantially on line 5—5 of Figure 2.

Referring now to the drawings in detail, 10 indicates a passenger vehicle equipped with a steering wheel 12 mounted on a steering column 14. A casing 16 providing a support for my switch parts is suitably bent to form a closed loop, and is secured to the steering column by a clamp 17. A bracket 18 is suitably secured to casing 16 as by welding. A screw 20 screwed into bracket 18 is provided to fasten clamp 17 about the steering column. I have provided a pair of ears 22 on bracket 18. Base plate 24 is held in place by screws 25 which turn into threaded holes in ears 22. See Fig. 5.

Figure 4:
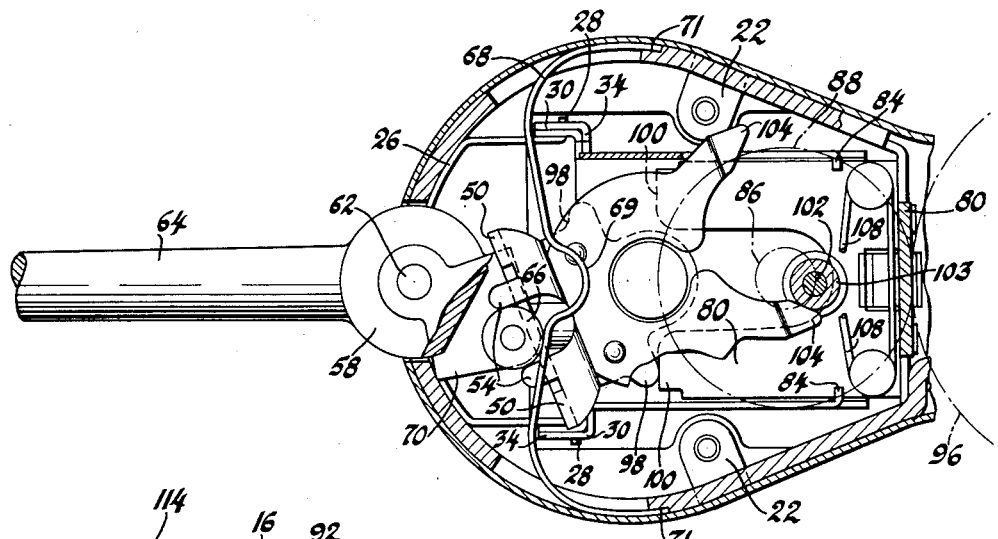
Figure 4 is a view with parts broken away and in section showing the relationship of the various parts of my device with the switch in position to indicate a right turn.

A generally U-shaped retaining clip 26 is secured to base plate 24 as by welding. Each arm of clip 26 has an outwardly extending tongue 28 which cooperates with a slot in the mounting bracket 30 of switch 32, holding the bracket and the switch in place in the base. Tongues 28 likewise extend through slots in supporting arms 34 of support or bridge plate 36. Bridge plate 36 is provided with a downwardly extending forward supporting arm 38 which has a pair of lugs 40 engageable with slots 41 in the base 24. A switch actuating member or plate 42 is pivotally supported by a pin 44 on bridge plate 36. Plate 42 carries a downwardly extending member 46 which is recessed to provide fingers 50 straddling arm 52 of switch 32. Another pair of fingers 54 on switch actuating member 42 straddles a roller 56 mounted in arm 58. Bracket 18 is provided with an inwardly bent recess 60 which receives pivot or hinge pin 62 carrying arm 58 and its operating handle 64. A second roller 66 is mounted on arm 58 above roller 56. Roller 66 cooperates with a holding spring 68 held in place in notches 71 of bracket 18. Spring 68 has a recess 69 to hold the movable parts in switch-off position. The design and location of spring 68 are such that the spring serves also to hold handle 64 in either of the switch-on positions. As can be seen in Fig. 4, wherein the switch parts are shown in their relationship for a right turn, the center of roller 66 is below a line drawn from the center of pivot pin 62 and the point of contact between roller 66 and spring 68. In this position, the parts form an overcenter device, or toggle, in which spring 68 biases handle 64 to one limit of its swing, provided by shoulder 70 on arm 58 coming into contact with bracket 18.

The operation of this much of my direction signal switch is as follows: Movement of operating handle 64 clockwise or counterclockwise to indicate a right or a left turn, respectively, moves roller 66 out of the recess 69 in spring 68 to one side of the recess. The position for a right turn is indicated in Figure 4. This movement of handle 64 carries with it roller 56 and cooperating fingers 54 of switch actuating plate 42, which thereupon pivots about pin 44 in bridge plate 36. When switch actuating plate 42 is thus pivoted, fingers 50 of this plate engage switch arm 52, moving it into its operating position for a right or left turn depending upon whether operating handle 64 is moved clockwise or counterclockwise, respectively.

Although the parts described above comprise a workable direction signal switch, I prefer to add means for returning the above described parts to switch opening position after the indicated turn has been made. To this end I provide a U-shaped slide plate 80 mounted on bridge plate 36. Plate 80 reciprocates in guides formed by upturned edges 82 of plate 36, and also between plate 36 and inwardly turned ends 84 of upturned edges 82. A spring 85 is provided to bias slide plate 80 to the left as seen in Figure 3. On the upper arm of a slide member 80 I mount a short shaft 86 which carries a wheel 88. Wheel 88 and shaft 86 are connected through a friction clutch comprising spring disk 90 which is biased against wheel 88 by tension screw 92. This friction clutch connection insures the mechanism against damage which might occur if any of the parts should be stuck or otherwise become inoperative while wheel 88 is being turned. I preferably provide a resilient tire 94 of any suitable material such as rubber on wheel 88 which engages hub 96 of steering wheel 12 when slide plate 80 is moved to the right as shown in Figure 3. This movement is effected by one of shoulders 98 on switch actuating plate 42 coming into contact with the cooperating extension 100 on slide plate 80. As seen in Figure 4, for a right turn the lower shoulder 98 is moved against lower extension 100 of the slide plate, moving the slide plate assembly to the right until tire 94 is in contact with steering wheel hub 96.

Shaft 86 carries an eccentric crankpin 102 on which is mounted a roller 103 which cooperates with U-shaped spring member comprising detents 104 supported on switch actuating plate 42. As best seen in Figure 3, the ends of the arms of spring 104 are bent upward into the plane of movement of crankpin 102. The position of the parts for a right turn is shown in Figure 4. As the driver of the vehicle turns the steering wheel clockwise to make the right turn, shaft 86 carrying eccentric crankpin 102 rotates counterclockwise and rides over lower detent 104 by merely pushing on the inclined surface presented by this spring detent and forcing the detent down. However, as soon as the turn has been completed, the driver will turn the steering wheel counterclockwise to straighten out the front wheels. Shaft 86 will thereupon turn clockwise, bringing roller 103 of crankpin 102 against the end of the lower detent 104, as indicated in Fig. 4. Continued counterclockwise rotation of the steering wheel causes switch actuating plate 42 to be turned clockwise about its pivot 44, returning operating handle 64 to off position with its roller 66 in recess 69 of holding spring 68. Fingers 50 simultaneously return arm 52 of switch 32 to the neutral position.

Slide plate 80 may be provided with a pair of posts 106 on which I may mount springs 108 which bear against roller 103 of crankpin 102. Springs 108 serve to hold crankpin 102 in the position shown in Figures 2 and 3 when the switch is in its neutral or off position. In this manner I assure against interference of crankpin 102 with either detent 104 when operating handle 64 is moved to a turn indicating position. Moreover, inasmuch as shaft 86 must turn through approximately 180° from the position of Figures 2 and 3 before roller 103 is in a position to engage either of detents 104, a moderate amount of movement of the steering wheel is permitted without any switch resetting action. How much rotation of the wheel can be so done depends upon the ratio of hub diameter to the diameter of tire 94, and upon slippage of the tire and the friction clutch. With a two to one ratio of the above diameters, the wheel could be rotated between a quarter and a third of a turn, thus allowing a moderate amount of steering without resetting the direction signal switch.

On one of the upturned edges 82 of bridge plate 36 I may provide an extension 110 in which I may mount a socket for a pilot light 112. To make the light of pilot 112 visible, I provide a translucent or transparent window 114 in casing 16.

Figure 6:
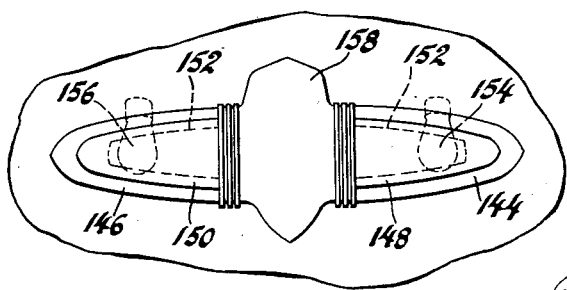
Figure 6 is a view showing an external light fixture which may conveniently be used with the signal system embodying my invention.

I have shown in Figure 6 a preferred form of fixture for housing the rear signal lights. This fixture comprises right and left housings 144 and 146, respectively, having transparent or translucent windows 148 and 150. I may also provide light impervious masks 152, shown in dotted lines, behind the windows 148 and 150. Right and left signal lamps 154 and 156 are mounted behind their respective windows. If desired, the central portion 158 may conveniently be used to house the tail lamp.

Figure 7:
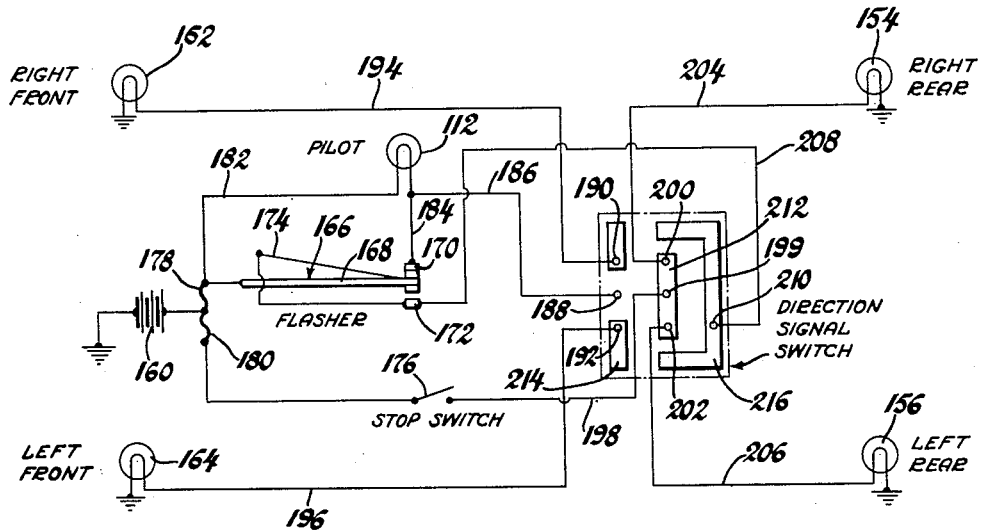
Figures 7 and 8 show a circuit diagram embodying a switch made according to my invention, shown in its off and left turn positions respectively.
Figure 8:
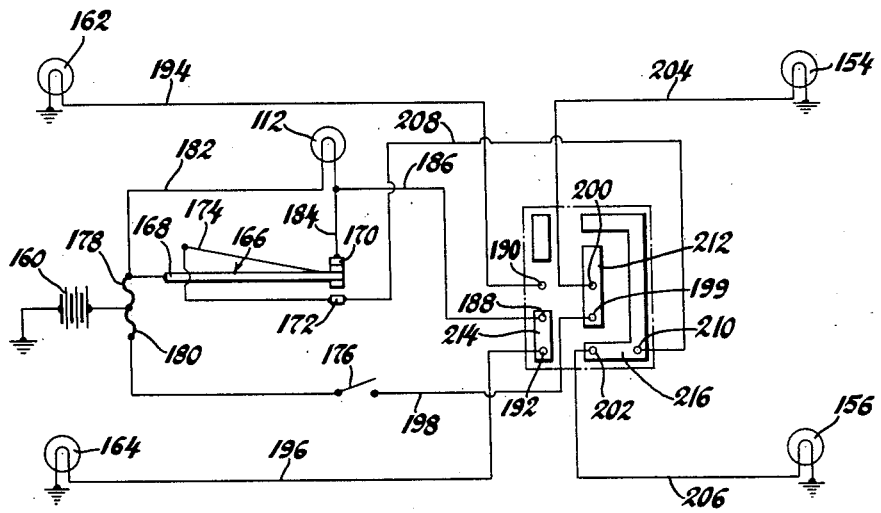

Referring to Figures 7 and 8, a suitable source of electric energy such as a storage battery 160 is provided to furnish the power to energize right and left rear signals 154 and 156, respectively, and right and left front signals 162 and 164, respectively. A flasher is indicated generally by 166. Any of a number of conventional flashers may be used but I prefer the type shown diagrammatically in the drawings. This flasher comprises an armature 168 carrying contacts at its free end to engage fixed contacts 170 and 172. Armature 168 is biased toward fixed contact 172 but is held in engagement with fixed contact 170 by the tension of wire 174. With the armature in the contact making position shown in the drawings the main flow of current is through armature 168 to contact 170. There is, however, a parallel flow through tension wire 174 to contact 172. The current flow through wire 174 heats this wire up just enough to permit armature 168 to be moved into engagement with contact 172 whereupon wire 174 is short circuited and cools, regaining its tension and pulling armature 168 out of engagement with contact 172 and re-establishing engagement with contact 170, whereupon the cycle starts over. The flasher shown in Figures 7 and 8 is illustrated diagrammatically. Flashers of this type are shown in detail in copending application S. N. 349,830 to Robert N. Falge et al., filed August 2, 1940. The circuit diagram shown in Figures 7 and 8 is likewise disclosed and is claimed in the aforesaid copending application.

Battery 160 is connected to flasher 166 and a brake actuated switch 176 through fuses 178 and 180, respectively. A conductor 182 connects one side of pilot 112 to the battery side of the flasher. The other terminal of pilot 112 is connected to contact 170 of the flasher through a conductor 184. Conductor 186 leads from conductor 184 to fixed contact 188 of the direction signal switch. Fixed contacts 190 and 192 are connected to right and left front signals 162 and 164 through conductors 194 and 196, respectively. Conductor 198 connects the brake actuated stop light switch with fixed contact 199 of the direction signal switch. Fixed contacts 200 and 202 are connected to right and left rear signal lights 154 and 156 through conductors 204 and 206, respectively. Conductor 208 connects fixed contact 172 of the flasher with fixed contact 210 of the direction signal switch. One terminal of the battery and a terminal of each of the signal lamps are connected to a common ground.

With the direction signal switch in the position indicated in Figure 7, when the driver steps on the brake to close switch 176 a circuit is established from battery 160 through fuse 180, stop switch 176, conductor 198, fixed contact 199 to bridging contact 212. The circuit from there is to the right and left rear signal lamps by way of fixed contacts 200 and 202, and conductors 204 and 206, respectively. There is at this time no circuit through the flasher and the rear signal lights burn continuously.

Referring now to Figure 8, the circuit for a left turn is shown. As before, with stop switch 176 closed a continuous current circuit is established for the right rear signal 154. A circuit to the left signal lamps is established through the flasher as follows: to left front signal lamp 164: from battery 160 through fuse 178, armature 168, fixed contact 170 of the flasher, conductors 184 and 186, fixed contact 188, bridging contact 214, fixed contact 192, and conductor 196 to lamp 164. A circuit is established simultaneously to pilot 112 through conductors 182 and 184. Another parallel circuit is established through tension wire 174 to contact 172. The current flow through this last mentioned circuit is, however, not enough to energize any signal lamp. It does suffice to heat wire 174 sufficiently to permit armature 168 to be disengaged from contact 170 to engage contact 172. The circuit thereupon established is as follows: battery 160 to fuse 178, armature 168, fixed contact 172, conductor 208, fixed contact 210, bridging contact 216, fixed contact 202, and conductor 206 to left rear signal light 156. It is evident then that with the direction signal switch set to indicate a left turn and with the stop light switch closed the front and rear signals on the left side of the vehicle burn intermittently and the right rear signal burns continuously. The circuit established for a right turn is similar and need not be detailed here.

I claim:

1. In a vehicle direction signal device, a support, a switch on the support, a plate pivotally mounted on the support operably connected to the switch, an operating handle for actuating the pivotally mounted plate, means on said support adapted to cooperate with said handle to yieldably hold the handle in any of its operative positions, a wheel and crank, mounting means therefor movably mounted on said support, means including said plate to move said mounting means into a position of engagement of said wheel with the rotary steering mechanism of the vehicle, said position of engagement being assumed only while the switch is closed, and means on said pivoted plate engageable by said crank for opening the switch upon actuation of the steering mechanism.

2. A vehicle direction signal device comprising a support, a plate pivotally mounted on the support, a switch mounted on the support and actuable by the pivoted plate, a handle for operation of the plate into switch open and switch closed positions, means on said support adapted to cooperate with said handle to yieldably hold the handle in any of its operating positions, a wheel and crank, mounting means therefor reciprocably disposed on the support, a pair of shoulders on the pivotally mounted plate on opposite sides of the pivot, means for biasing said mounting means into engagement with said shoulders, and means on said pivoted plate engageable with said crank when the plate is pivoted to switch closed position, whereby pivoting of said plate to switch closed position causes one of said shoulders to reciprocate the wheel mounting means into a position of engagement of the wheel with the steering mechanism of the vehicle, and actuation of the latter returns the plate to switch open position.

3. In operating means for vehicle direction signals, a support, a wheel carrier mounted on the support for movement toward or away from the axis of the steering shaft, a wheel rotatably mounted on the carrier and adapted to be operatively engaged with the steering shaft when the carrier is moved toward the shaft axis, an eccentric projection carried by the wheel, a detent carrier movably mounted on the support and provided with a detent shiftable into the path of movement of the eccentric projection upon movement of the detent carrier in one direction and with a second detent shiftable into the path of movement of the eccentric projection upon movement of the detent carrier in the opposite direction, and operator controlled means mounted on said support and associated with said wheel carrier and detent carrier for simultaneously moving the wheel carrier to cause the wheel to operatively engage the steering shaft and moving the detent carrier to cause one or the other of said detents to be shifted into the path of movement of the projection.

4. In combination, a support, a base plate secured thereto, a retaining clip secured in the base plate, tongues on said retaining clip, a mounting bracket having slots engaged by said tongues, a switch on the mounting bracket, a bridge plate, supporting arms on the bridge plate having slots engaged by said tongues, a switch actuating plate pivoted on said bridge plate, and fingers on said actuating plate engaging the switch.

5. The combination of claim 4, and an operating handle pivotally mounted on the support, a roller mounted on said handle, fingers on said actuating plate engaged by the roller, a second roller on the handle, and a recessed spring secured to said support and engaged by said second roller for holding the handle in any of its operating positions.

6. In a vehicle direction signal device, a support, a bracket secured thereto, ears on said bracket, a base plate secured in position relative to the support by means cooperating with said ears, a retaining clip secured in the base plate, tongues on said retaining clip, a mounting bracket having slots engaged by said tongues, a switch on said mounting bracket, a bridge plate, supporting arms on the bridge plate having slots engaged by said tongues, a switch actuating plate pivoted on said bridge plate, fingers on said actuating plate engaging the switch, a pair of upturned edges on said bridge plate, a slide plate disposed between said upturned edges, means carried by said slide plate for engagement with the steering mechanism upon closing of the switch, and means carried by the actuating plate and cooperating with said last named means for returning the switch to open position upon actuation of the steering mechanism.

7. In a vehicle direction signal device, a casing, a bracket secured thereto, ears on said bracket, a base plate secured to the ears, a retaining clip held in place in the base plate, tongues on the clip, a mounting bracket having slots engaged by said tongues, a switch on said mounting bracket, a bridge plate, supporting arms on the bridge plate having slots engaged by the tongues, a switch actuating plate pivotally mounted on the bridge plate, and means connecting said plate to said switch.

8. The combination of claim 7, in which said means includes an arm on said switch and fingers on said actuating plate engaging said arm, and handle means mounted on said casing to actuate said switch actuating plate.

9. The combination of claim 7, and a handle pivotally mounted on said casing, means connecting the handle to the actuating plate, and yieldable means on said casing adapted to cooperate with said handle to hold the handle in any of its operating positions.

10. In a vehicle direction signal device, a support adapted to be mounted adjacent the vehicle steering mechanism, a switch on said support, a switch actuating plate pivotally mounted on said support, a rotatable member, means to rotatably mount said member on said support for reciprocal movement relative to said plate, means on said plate adapted to engage said switch and additional means on said plate adapted to engage said mounting means for said rotatable member to actuate said switch and move said rotatable member on said support relative to said plate into engagement with a rotatable portion of the steering mechanism when said plate is pivoted to either side of a central position, and means on said plate adapted to be engaged by a means on said rotatable member on rotation of said member to return said plate to its central position.

11. In a vehicle direction signal device, a support adapted to be mounted adjacent the vehicle steering mechanism, a wheel rotatably mounted on said support and adapted to be rotated by the steering mechanism, said wheel being provided with a projection eccentric to the axis thereof, a switch on said support having a normally open position, a switch actuating plate pivotally mounted on said support, means to connect said plate to said switch adapted to move said switch to a closed position on pivotal movement of said plate from its normal position, manually operable means to actuate said plate, and a detent secured to said plate which is out of the path of movement of said projection in the normal position of said plate but so located thereon as to move into such path on pivotal movement of said plate whereby rotation of said wheel will then operate through said detent to return said plate to its normal position and said switch to its open position.

12. In a vehicle direction signal device, a support adapted to be mounted adjacent the vehicle steering mechanism, a wheel rotatably mounted on said support and adapted to be rotated by the steering mechanism, said wheel being provided with a projection eccentric to the axis thereof, a switch on said support having a central open position, a switch actuating plate pivotally mounted on said support, means to connect said plate to said switch adapted to move said switch to selective closed positions on adjustment of said plate to opposite sides of a central position thereof, a pair of spaced detents carried by said plate which are out of the path of movement of said projection in the central position of said plate but so located thereon that one of said detents will be moved into such path on adjustment of said plate to move said switch to one of its closed positions, whereby rotation of said wheel will then operate through the respective detent to return said plate to its central position and said switch to its open position.

GORDON E. ROEDDING.